(12) United States Patent
Minick

(10) Patent No.: US 8,091,836 B2
(45) Date of Patent: Jan. 10, 2012

(54) ROTARY WING SYSTEM WITH ION FIELD FLOW CONTROL

(75) Inventor: Alan B. Minick, Madison, AL (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 463 days.

(21) Appl. No.: 11/960,126

(22) Filed: Dec. 19, 2007

(65) Prior Publication Data

US 2009/0159754 A1   Jun. 25, 2009

(51) Int. Cl.
*B64C 21/00* (2006.01)
(52) U.S. Cl. ............... 244/205; 244/1 N; 244/204
(58) Field of Classification Search .............. 244/205, 244/1 N, 1 A, 204, 17.11, 17.13
See application file for complete search history.

(56) References Cited

U.S. PATENT DOCUMENTS

| | | | | |
|---|---|---|---|---|
| 2,765,975 | A | * | 10/1956 | Lindenblad ............... 315/111.91 |
| 3,446,464 | A | * | 5/1969 | Donald ........................ 244/130 |
| 4,418,287 | A | * | 11/1983 | Syverson ...................... 290/44 |
| 4,697,769 | A | * | 10/1987 | Blackwelder et al. ..... 244/199.2 |
| 5,964,433 | A | * | 10/1999 | Nosenchuck .............. 244/205 |
| 6,247,671 | B1 | * | 6/2001 | Saeks et al. ............... 244/205 |
| 6,570,333 | B1 | * | 5/2003 | Miller et al. ............. 315/111.21 |
| 6,698,684 | B1 | | 3/2004 | Henne et al. |
| 6,793,177 | B2 | | 9/2004 | Bonutti |
| 6,796,532 | B2 | | 9/2004 | Malmuth et al. |
| 6,805,325 | B1 | | 10/2004 | Malmuth et al. |
| 6,824,108 | B2 | | 11/2004 | Bonutti |
| 6,978,767 | B2 | | 12/2005 | Bonutti |
| 7,255,062 | B1 | | 8/2007 | Higman |
| 7,532,451 | B2 | * | 5/2009 | Krichtafovitch et al. ...... 361/233 |
| 7,637,455 | B2 | * | 12/2009 | Silkey et al. ................ 244/53 B |
| 2004/0195462 | A1 | * | 10/2004 | Malmuth et al. ............. 244/205 |
| 2006/0017004 | A1 | * | 1/2006 | Minick et al. ............. 250/423 R |
| 2006/0038087 | A1 | | 2/2006 | Minick et al. |
| 2006/0054737 | A1 | * | 3/2006 | Richardson ................ 244/17.11 |
| 2008/0101913 | A1 | * | 5/2008 | Lee et al. .......................... 415/1 |
| 2009/0127401 | A1 | * | 5/2009 | Cousins et al. .............. 244/205 |

OTHER PUBLICATIONS

Jukes et al., Turbulent Drage Reduction by Surface Plasma through Spanwise Flow Oscillation, Jun. 2006, American Institute of Aeronautics and Astronautics, pp. 1-14.*
http://en.wikipedia.org/wiki/Plasma_(physics).*
http://en.wikipedia.org/wiki/Plasma_acceleration.*
http://en.wikipedia.org/wiki/Ion_wind.*
List et al., Using a Plasma Actuator to Control Laminar Separation on a Linear Cascade Turbine Blade, 2003, AIAA.*
Huang, Separation Control Over Low Pressure Turbine Blades Using Plasma Actuators, Apr. 2005, Huang.*

* cited by examiner

*Primary Examiner* — Joshua Michener
(74) *Attorney, Agent, or Firm* — Carlson Gaskey & Olds P.C.

(57) ABSTRACT

A rotary-wing system which generates a directed ion field to propel a fluid along a rotary-wing to control at least one boundary layer characteristic.

15 Claims, 4 Drawing Sheets

ROTARY WING SYSTEM WITH ION FIELD FLOW CONTROL

BACKGROUND OF THE INVENTION

The present application relates to a rotary-wing system with increased efficiency through manipulation of a boundary layer.

A propeller system is limited in effectiveness and power density by the maximum speed achievable at the blade tip without separation and the associated drag and vortex generation. Since the speed of the remainder of the propeller is limited by the tip speed, the overall efficiency of the propeller is thereby limited. Likewise, as the propeller forward speed changes relative to the surrounding fluid, the effective velocity and vector at the tip changes which further limits the rotational speed achievable without separation.

SUMMARY OF THE INVENTION

A rotary-wing system according to an exemplary aspect of the present invention includes: a rotary-wing rotatable about an axis of rotation; at least one emitter mounted to the rotary wing; and at least one attractor mounted to the rotary wing adjacent to the at least one emitter to generate a directed ion field therebetween to control at least one boundary layer characteristic.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
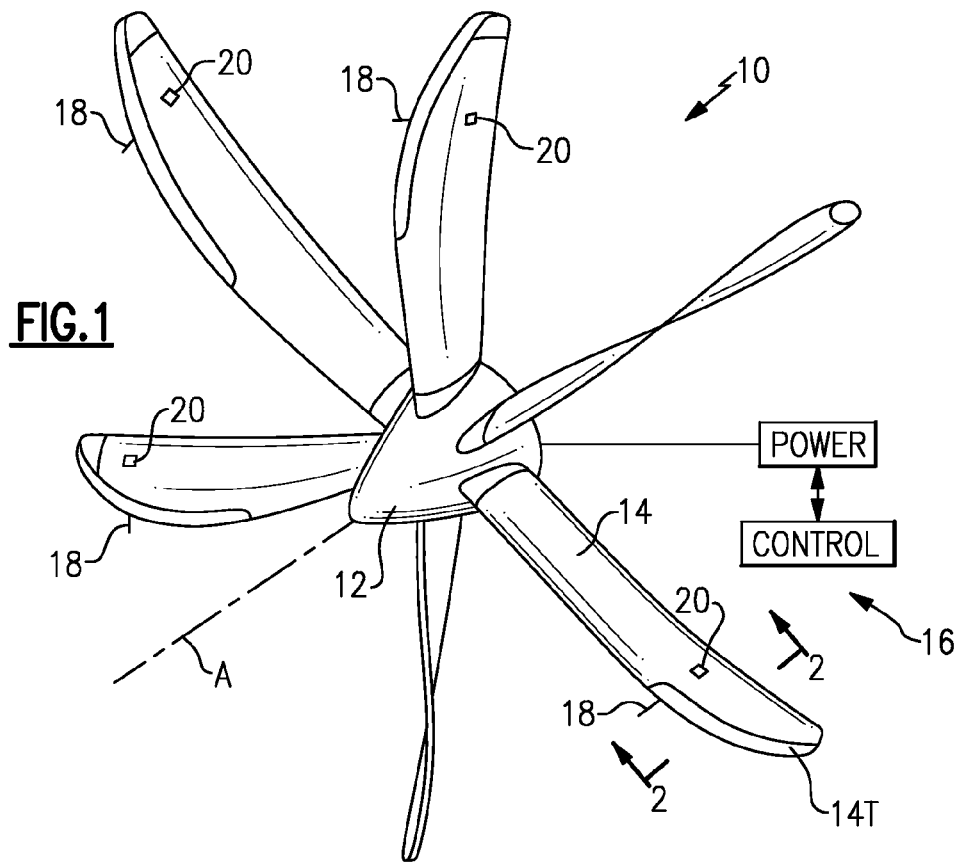
FIG. 1 is a schematic perspective view of a rotary-wing system with an ion flow control system according to the present invention.

FIG. 1 illustrates a general perspective view of a propeller system 10. The propeller system 10 includes a hub assembly 12 which supports a multiple of propeller blades or rotary-wings 14 which rotate about an axis of rotation A. It should be understood that although a propeller blade system typical of a fixed wing aircraft is illustrated in the disclosed embodiment, various propeller and rotor blade systems including helicopters, compound rotary wing aircraft with supplemental translational thrust systems, dual contra-rotating, coaxial rotor system aircraft, turbo-props, tilt-rotors, tilt-wing and fixed wing aircraft of various configurations as well as fixed systems such as wind turbines and such like will also benefit from the present invention. That is, rotary-wing as utilized herein may be any propeller blade and rotary wing which rotates about an axis of rotation.

The propeller system 10 includes an ion flow control system 16. The system 16 includes a set of at least one emitter 18 and at least one attractor 20 on each rotary-wing 14. Each of the emitters 18 and the attractors 20 in the illustrated non-limiting embodiment may be powered from a power source P capable of producing, for example only, pulsed DC power, constant DC power or an alternative power source. Further, the power source P may power the emitters 18 and attractors 20 in response to at least one boundary layer characteristic, for example, or in response to at least one rotary-wing operating condition. It should be understood that the duty cycle of a pulsed DC power source can be optimized for maximum efficiency.

Figure 2:
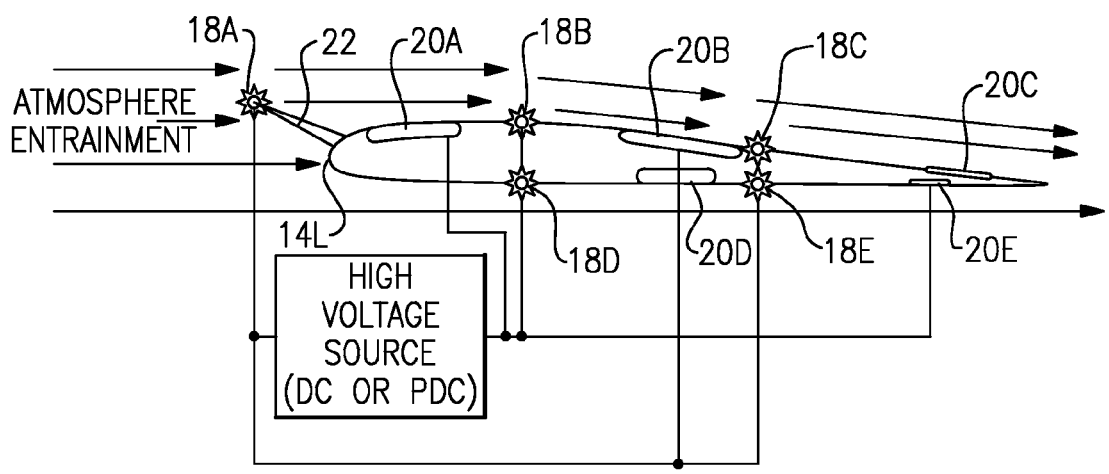
FIG. 2 is a sectional view of one rotary-wing illustrating the ion flow control system.

Referring to FIG. 2, a first emitter 18A may be located forward of a rotary wing leading edge 14L and a first attractor 20A may be located proximate the leading edge 14L. In one non-limiting embodiment, the first emitter 18A may be located forward of the rotary wing leading edge 14L upon a probe 22 which extends from the leading edge 14L. Similarly and for example only, the first emitter may be positioned directly upon all or some portion of the leading edge itself. Additional emitters 18B, 18C and attractors 20B, 20C sets may be positioned along an upper surface 14U of the rotary-wing 14 to define an emitter/attractor network.

In one non-limiting embodiment, the emitters 18B, 18C and respective attractors 20B, 20C may be located in a mid-span region and trailing edge region. Still further, at least one additional emitter 18D, 18E and attractor 20D, 20E sets may be positioned along a lower surface 14M of the rotary-wing 14. It should be understood that other emitter/attractor network arrangements may alternatively or additionally be provided. It should further be understood that any number of sets may be mounted to each rotary-wing 14 so as to generate a desired boundary layer modification.

Figure 3:
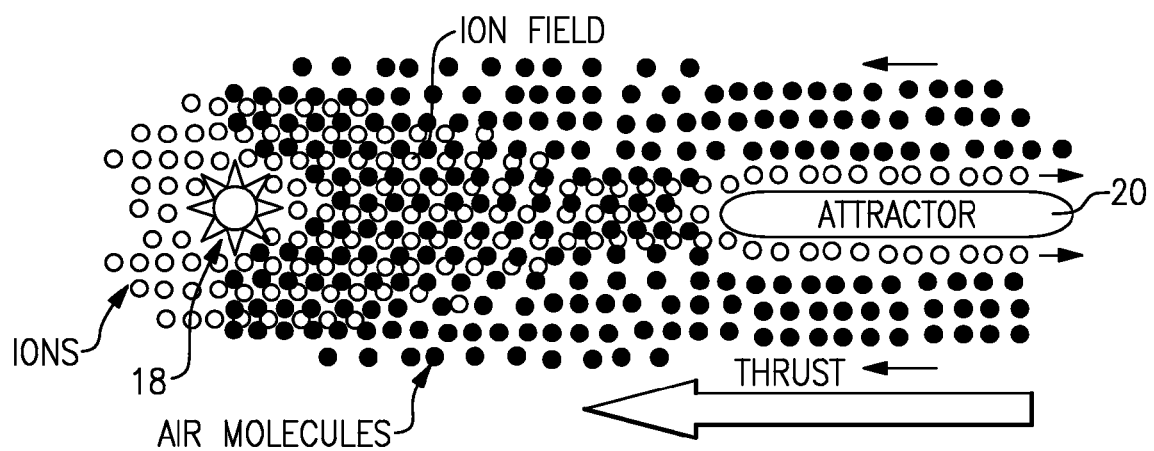
FIG. 3 is a schematic representation of the fluid flow in response to the ion flow control system.

Each of the emitters 18 and each of the attractors 20 may be manufactured of an electrically conductive material such as, for example only, carbon fiber material or nanotubes. Each emitter 18 operates as an ion source and each attractor 20 operates as an ion collector such that the emitter/attractor network may be utilized to create a directed ion field (FIG. 3). Created ions repelled by the emitter 18, drive the emitter 18 forward and ions aft while the opposite charge on the respective attractor 20 accelerates ion towards (and past) the attractor which accelerates the attractor 20 forward by attraction to the created ions. Such related emitter-attractor sets may be stacked for improved efficiency.

A concentrated field around each emitter 18 ionizes the adjacent atmosphere which is accelerated towards the less concentrated attractor 20 mounted further aft on the rotary-wing 14 (FIG. 3). The ions bearing the same charge as the emitter 18 are repelled, then attracted to the attractor 20 with a diffused field insufficient to initiate ionization but strong enough to attract the ions generated at the emitter 18. This attraction both continues to accelerate the ion and accelerates the receiver/attractor toward the created ions. Both actions add to the forward thrust of the rotary-wing. As the ions travel towards the attractor, collision with other atmospheric molecules causes acceleration of non-ionized entrained atmosphere that further increases the flow across the rotary-wing 14.

Through variation in boundary layer control (including reduced or reversed flow) across various portions of the rotary-wing 14, various additional effects such as steering, braking, increased lift, and stability may alternatively and additionally be accomplished in addition to drag reduction. As generally understood, the definition of a boundary layer as utilized herein is a thin layer of fluid immediately next to a solid body that flows more slowly than the rest of the fluid. It should be understood that although boundary layer is described herein as being controlled, since the fluid adjacent the solid body such as the rotary-wing is accelerated faster than the rest of the fluid, that area may understood as not actually being part of the boundary layer as generally understood. In other words, the present invention does reduce the boundary layer and also affects the fluid beyond the boundary layer.

Figure 4:
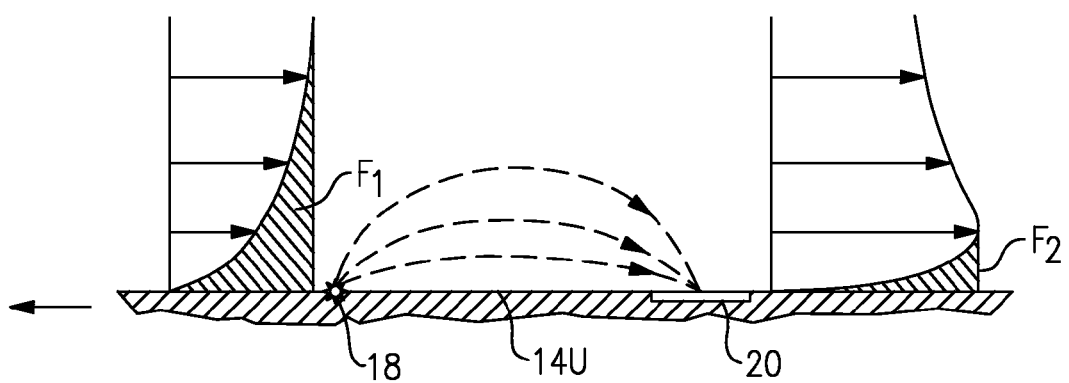
FIG. 4 is a schematic view illustrating a change in boundary flow in response to operation of the ion flow control system.

Referring to FIG. 4, the directed ion flow modifies the boundary layer flow across the rotary-wing 14. The velocity of a fluid traveling in the boundary layer prior to application of the directed ion flow is illustrated graphically on the left side of FIG. 4 as shaded region F1. The shaded region F1 represents the velocity reduction of the fluid relative a distance from the upper surface 14U. That is, the fluid at the top of the shaded region F1 is further away from the surface 14U than the fluid at the bottom of the shaded region F1.

After the directed ion flow is generated within the fluid, the boundary layer velocity loss characteristics are altered as schematically illustrated in a second shaded region F2. The second shaded region F2 illustrates the reduction in velocity loss of the fluid in the boundary layer after the influence of the directed ion field. In the illustrated example of FIG. 4, the directed ion flow directs the fluid in a direction opposing the direction of motion of the rotary wing 14. This results in an increased fluid velocity and the reduced boundary layer thickness as shown in shaded region F2.

Reduction of the boundary layer has the effect of reducing the parasitic drag and inhibiting boundary layer separation. Boundary layer separation occurs primarily at a tip of the rotary-wing to create an air gap between the boundary layer and the upper surface 14U of the rotary-wing 14, i.e., a wake vortex can be created which results in a decrease in performance characteristics of the rotary-wing 14 whether driven or driving. That is, operation of the system 16 reduces the boundary layer thickness or build up as well as inhibit flow separation to increase the efficiency thereof.

Figure 5:
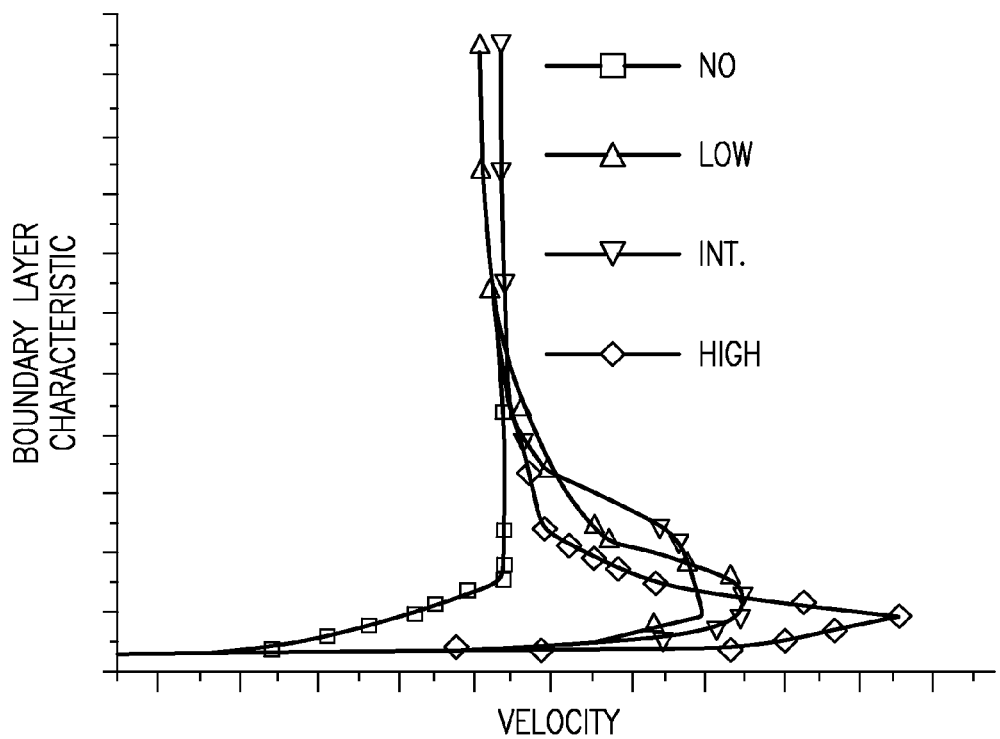
FIG. 5 is a graphical view of a boundary layer characteristic in response to particular control levels of the ion flow control system.

Referring to FIG. 5, the system 16 may be utilized to selectively vary the thickness of the boundary layer, the fluid flow velocity near the surface, and the flow direction in response to adjustment of the applied level of control. Representative fluid velocities and boundary layer characteristics for no control (NO), low level control (LOW), intermediate level control (INT.) and a high level control (HIGH) are schematically illustrated. As indicated by the fluid velocities at the varying levels of control, the higher the level of control applied, the greater the impact on the adjacent fluid velocities and the boundary layer thickness.

The NO control boundary layer characteristic illustrates the thickness of the boundary layer without the application of any control (such as $F_1$ in FIG. 4). The Y axis illustrates the boundary layer thickness. As a larger level of control is applied, the effective thickness of the boundary layer decreases and the velocity of the fluid in the boundary layer is accelerated to match or exceed the initial fluid velocity. Varying the level of control is achieved by adjusting the strength of the directed ion field as in response to the level of power being applied across the emitter/attractor network.

Figure 6:
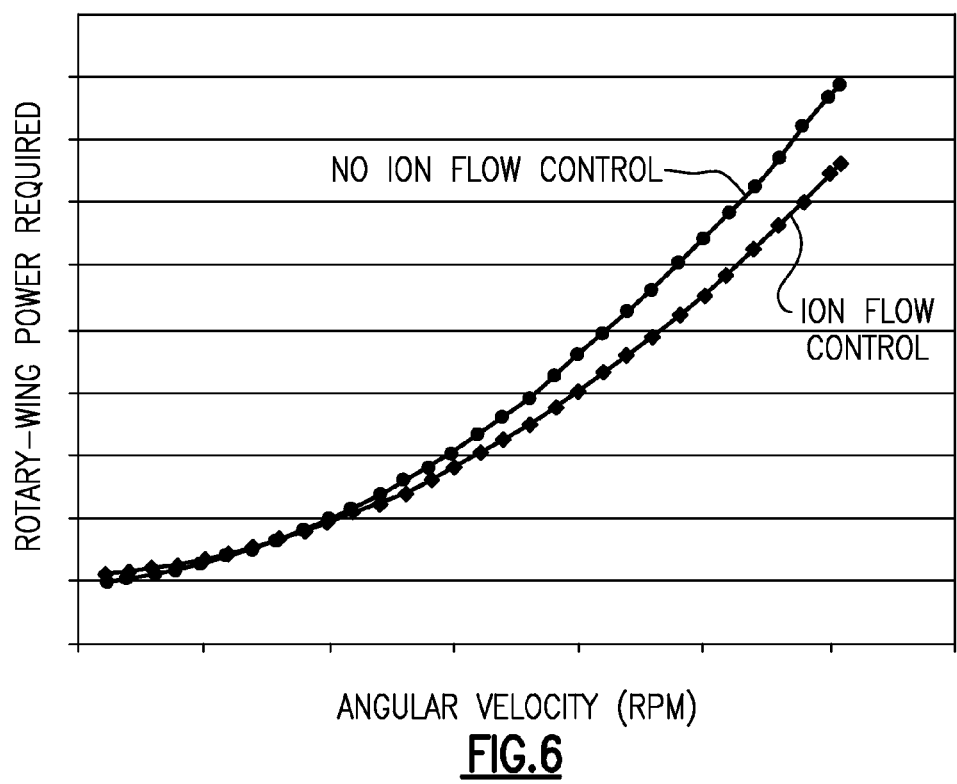
FIG. 6 is a graphical representation illustrating the reduced propeller rotary-wing power requirements in response to operation of the ion flow control system.

Referring to FIG. 6, a reduction in rotary-wing power required at a given operating speed with application of ionic flow control is graphically represented. Application of ion flow control to the outer section—for example only, the outer one-third of the rotary-wing 14 span—increases airflow attachment across the rotary-wing blade tip 14T which facilitates an increased operating speed and higher efficiency. Boundary layer control of the rotary-wing 14 also facilitates a reduction in parasitic drag, reduced separation, and reduced wake drag.

When constructing a rotary-wing 14 it is typically necessary to account for non-optimal airflow conditions by, for example, varying forward speed, tip speed, and pitch. Implementing boundary layer control on the surface of the rotary-wing 14 such as described herein minimizes the impact of adverse conditions and allows for the rotary-wing 14 to be operated at a higher efficiency than is possible without boundary layer control.

Figure 7:
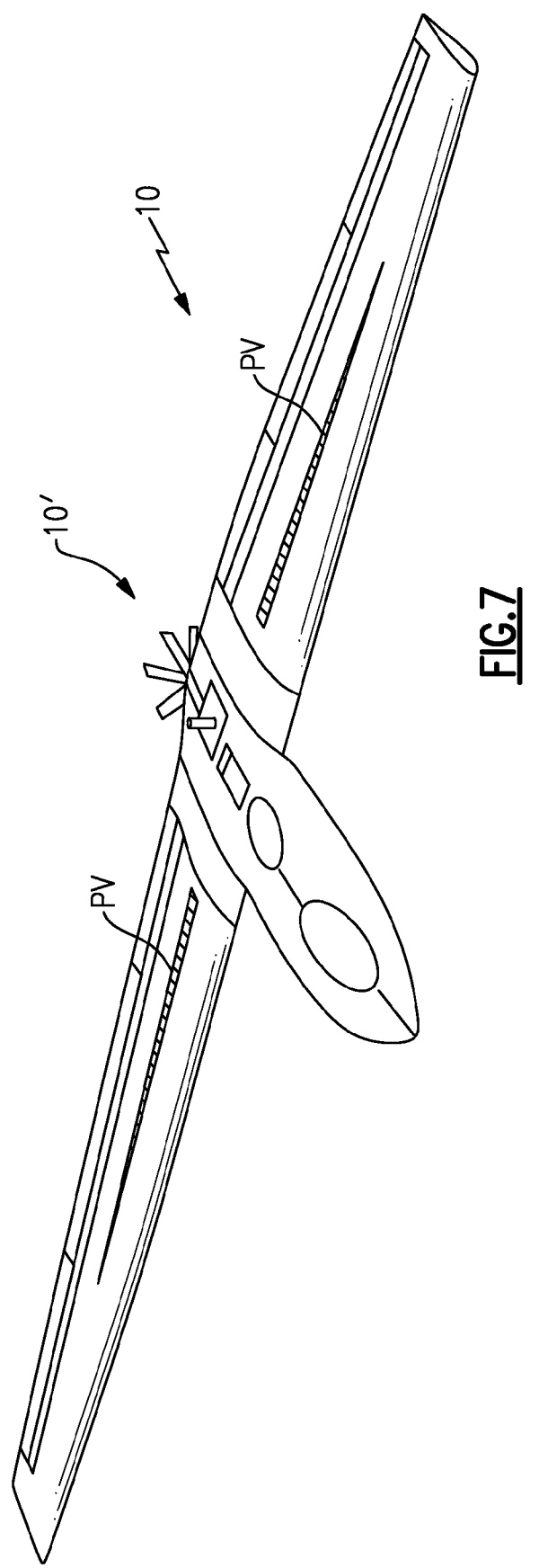
FIG. 7 is a perspective view of one non-limiting embodiment of an aerial vehicle for use with the ion flow control system.

Referring to FIG. 7, an air vehicle 100 driven by an ion flow control propeller system 10' offers highly efficient propulsion to provide for nearly continuous operation with solar electric power from photovoltaic (PV) cells and high power density batteries permitting both daylight and nighttime flight. The ion flow control propeller system 10' may alternatively or additionally be powered by a variety of electrical power sources—photovoltaics (PVs), batteries, electrical generators, or a combination depending upon the vehicle configuration and mission requirements.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air vehicle comprising:
   a rotary-wing system which supports a multiple of rotary wings which rotate about an axis of rotation;
   an emitter mounted to one of said rotary wings; and
   an attractor mounted to said one of said rotary wings adjacent to said emitter to generate a directed ion field therebetween to modify at least one boundary layer characteristic;
   a power source to power said emitter and said attractor; and
   a controller which adjusts said power source to control modification of said at least one boundary layer characteristic in response to at least one rotary-wing operating condition.

2. The vehicle as recited in claim 1, wherein said power source comprises photovoltaic (PV) cells.

3. The vehicle as recited in claim 1, wherein said rotary-wing system comprises a propeller system.

4. The vehicle as recited in claim 1, wherein said at least one rotary-wing operating condition includes steering.

5. The vehicle as recited in claim 1, wherein said at least one rotary-wing operating condition includes deceleration.

6. The vehicle as recited in claim 1, wherein said at least one rotary-wing operating condition includes a change in lift.

7. The vehicle as recited in claim 1, wherein said at least one rotary-wing operating condition includes an increased stability.

8. The vehicle as recited in claim 1, wherein said directed ion field includes a concentrated field around said emitter which ionizes adjacent atmosphere, said concentrated field accelerated towards said attractor mounted aft of said emitter on the rotary-wing.

9. The vehicle as recited in claim 1, wherein ions bearing the same charge as said emitter are repelled then attracted to said attractor with a diffused field insufficient to initiate ionization but strong enough to attract the ions generated at said emitter to accelerate the ions and accelerate said attractor toward the ions generated at said emitter.

10. The vehicle as recited in claim 9, wherein acceleration of said attractor toward the ions generated at said emitter add to a forward thrust of said rotary-wing.

11. The vehicle as recited in claim 10, wherein collision with other atmospheric molecules as ions travel towards said attractor causes acceleration of non-ionized entrained atmosphere to increase flow across said rotary-wing.

12. The vehicle as recited in claim 1, wherein said at least one rotary-wing includes a propeller blade.

13. The vehicle as recited in claim 1, wherein said one of said rotary-wings includes more than one emitter and more than one attractor.

14. The vehicle as recited in claim 1, wherein said rotary-wings each include at least one emitter and at least one attractor.

15. The vehicle as recited in claim 1, wherein said rotary-wings each include more than one emitter and more than one attractor.

\* \* \* \* \*